(12) United States Patent
Farooqi et al.

(10) Patent No.: US 12,428,060 B2
(45) Date of Patent: *Sep. 30, 2025

(54) METHODS AND APPARATUS TO CONTROL A TORQUE THRESHOLD FOR HANDS ON/OFF DETECTION

(71) Applicant: Ford Global Technologies, LLC, Dearborn, MI (US)

(72) Inventors: Quazi Farooqi, Troy, MI (US); Darrel Alan Recker, Ypsilanti, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,020

(22) Filed: Apr. 24, 2024

(65) Prior Publication Data

US 2024/0278833 A1   Aug. 22, 2024

Related U.S. Application Data

(63) Continuation of application No. 18/320,542, filed on May 19, 2023, now Pat. No. 11,993,307, which is a
(Continued)

(51) Int. Cl.
*B62D 15/02* (2006.01)
*G01L 3/00* (2006.01)
(Continued)

(52) U.S. Cl.
CPC ............. *B62D 15/025* (2013.01); *G01L 3/00* (2013.01); *G01P 3/00* (2013.01); *G07C 5/02* (2013.01)

(58) Field of Classification Search
CPC . B62D 15/025; G01L 3/00; G01P 3/00; G01P 21/02; G07C 5/02
See application file for complete search history.

(56) References Cited

U.S. PATENT DOCUMENTS 9,371,089 B2 *  6/2016 Werling ............... B62D 15/025
10,358,164 B2   7/2019 Wilhelm et al.
(Continued)

FOREIGN PATENT DOCUMENTS

DE   102014208862 A1   11/2015

OTHER PUBLICATIONS

United States Patent and Trademark Office, "Notice of Allowance and Fee(s) Due," issued in connection with U.S. Appl. No. 17/150,819, dated Feb. 22, 2023, 9 pages.
(Continued)

*Primary Examiner* — Rodney A Butler
(74) *Attorney, Agent, or Firm* — Hanley, Flight & Zimmerman, LLC; Lorne Forsythe

(57) ABSTRACT

Methods and apparatus to control a torque threshold for hands on/off detection are disclosed. An example non-transitory machine readable storage medium includes instructions to cause programmable circuitry to at least identify a velocity of a steering rack or an angular velocity associated with a steering wheel, cause a first torque threshold associated with a first rotational direction of the steering wheel to be different from a second torque threshold associated with a second rotational direction of the steering wheel when the velocity or the angular velocity satisfies a threshold, identify a steering torque encountered by the steering wheel, and detect a hands off condition when the steering torque does not satisfy the first torque threshold nor the second torque threshold.

19 Claims, 7 Drawing Sheets

Related U.S. Application Data continuation of application No. 17/150,819, filed on Jan. 15, 2021, now Pat. No. 11,702,137.

(51) Int. Cl.
  *G01P 3/00* (2006.01)
  *G07C 5/02* (2006.01)

(56) References Cited

U.S. PATENT DOCUMENTS

| | | |
|---|---|---|
| 11,702,137 B2 | 7/2023 | Farooqi et al. |
| 2017/0350777 A1 | 12/2017 | Oschlies |
| 2019/0315398 A1 | 10/2019 | Moreillon et al. |
| 2020/0108858 A1 | 4/2020 | Moreillon et al. |
| 2020/0353978 A1 | 11/2020 | Hwang et al. |
| 2022/0227419 A1 | 7/2022 | Farooqi et al. |
| 2023/0294769 A1 | 9/2023 | Farooqi et al. |

OTHER PUBLICATIONS

United States Patent and Trademark Office, "Notice of Allowance and Fee(s) Due," issued in connection with U.S. Appl. No. 18/320,542, dated Jan. 18, 2024, 9 pages.

\* cited by examiner

METHODS AND APPARATUS TO CONTROL A TORQUE THRESHOLD FOR HANDS ON/OFF DETECTION

RELATED APPLICATION

This patent arises from a continuation of U.S. patent application Ser. No. 18/320,542, which was filed May 19, 2023, which is a continuation of U.S. patent application Ser. No. 17/150,819 (now U.S. Pat. No. 11,702,137), which was filed on Jan. 15, 2021. U.S. patent application Ser. No. 18/320,542 and U.S. patent application Ser. No. 17/150,819 are hereby incorporated herein by reference in their entireties. Priority to U.S. patent application Ser. No. 18/320,542 and U.S. patent application Ser. No. 17/150,819 is hereby claimed.

FIELD OF THE DISCLOSURE

This disclosure relates generally to semi-autonomous and/or autonomous driving, and, more particularly, to methods and apparatus to control a torque threshold for hands on/off detection.

BACKGROUND

In recent years, automotive manufacturers have made advancements to enable autonomous and/or semi-autonomous driving. In particular, automotive manufacturers have utilized hands on/off detection (HOOD) to ensure that a driver remains engaged while autonomous and/or semi-autonomous driving features are enabled.

SUMMARY

Example methods and apparatus to control a torque threshold for hands on/off detection is disclosed herein. An example apparatus disclosed herein includes memory including instructions, and one or more processors to execute the instructions to cause the one or more processors to at least compare a velocity of a rack to at least one of a first velocity threshold or a second velocity threshold, adjust a first torque threshold in response to the velocity of the rack satisfying the first velocity threshold, adjust a second torque threshold in response to the velocity of the rack satisfying the second velocity threshold, compare a torque between the rack and a steering shaft to the first torque threshold and the second torque threshold, and detect a hands off condition in response to the torque between the rack and the steering shaft not satisfying the first torque threshold or the second torque threshold.

An example method to detect a hands on/off condition of a driver disclosed herein includes comparing a velocity of a rack to a rack velocity threshold, adjusting a first torque threshold in response to the velocity of the rack satisfying the rack velocity threshold, comparing a torque between the rack and a steering shaft to at least one of the first torque threshold or a second torque threshold, and detecting a hands off condition in response to the torque not satisfying the first torque threshold or the second torque threshold.

An example apparatus disclosed herein includes a motor operatively coupled to a rack, a current associated with the motor to indicate a velocity of the rack, a torque sensor operatively coupled to an interface of the rack and a steering shaft, the torque sensor to determine a torque at the interface of the rack and the steering shaft, and an autonomous steering control system including a first torque threshold and a second torque threshold to be associated with a hands on/off condition, the autonomous steering control system to adjust the first or second torque threshold in response to the velocity of the rack satisfying a rack velocity threshold, compare the torque at the interface of the rack and the steering shaft to the first and second torque threshold, and detect a hands off condition in response to the torque not satisfying the first or second torque threshold.

Figure 1:
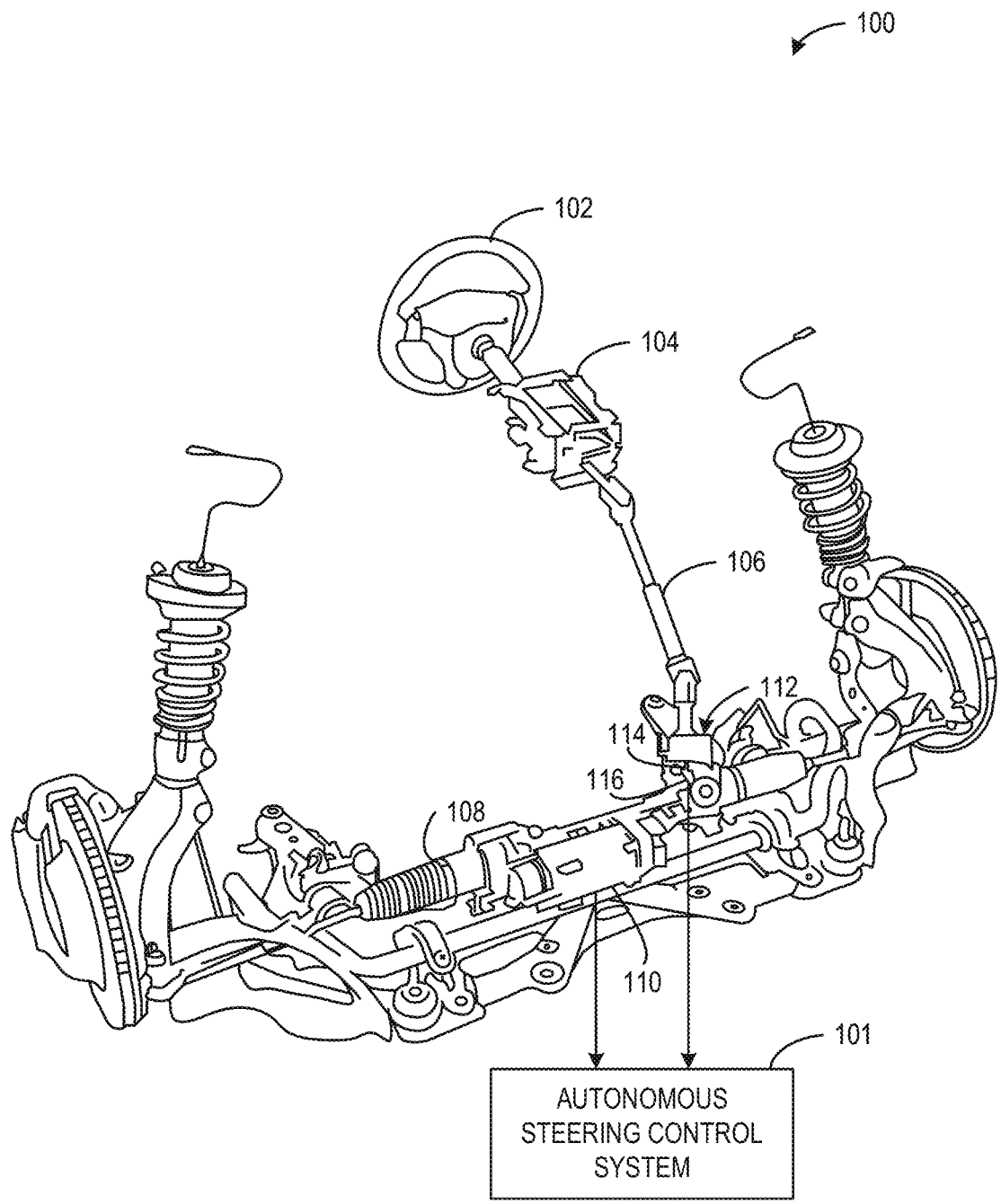
FIG. 1 illustrates an example rack electric power assist steering (EPAS) system.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example methods and apparatus to control a torque threshold for hands on/off detection (HOOD). Level 2 and/or 3 autonomous driving systems enable a vehicle to be driven while the driver has their hands off the steering wheel for a limited amount of time, as dictated by Electronic Commission of Europe (ECE) Regulation No. 79 and recommendations from the National Highway Traffic Safety Administration (NHTSA), for instance. Vehicles with level 2 autonomous driving capabilities include an automated system that controls accelerating, braking, and/or steering the vehicle, but the driver is expected to be ready to intervene at any time if a feature of the automated system fails to respond properly. As such, the automated system ensures that the driver is ready to intervene by determining whether the driver is in contact with (e.g., has their hands on) the steering wheel (e.g., HOOD). The automated system may provide a notification to the driver and/or adjust operations of the vehicle in response to determining that the driver is not in contact with the steering wheel. Further, level 3 autonomous driving is similar to level 2 but with more advanced automated features that enable the driver to turn their attention away from driving tasks (e.g., not be in contact with the steering wheel) for a longer period of time.

Known automated driving systems utilize sensors for HOOD. In some instances, the automated system utilizes touch sensors implemented in the steering wheel for HOOD. However, implementing touch sensors in the steering wheel results in a significant cost increase for the vehicle. In some other instances, the automated system utilizes a torque sensor associated with the steering system for HOOD. In such instances, a torque measured by the torque sensor is utilized to determine whether a driver has her/his hands on the steering wheel. For instance, when the automated system rotates a steering column to turn the vehicle, the automated system expects contact between the driver and the steering wheel to provide a resistance to the rotation of the steering column and, thus, a torque.

However, steering systems utilized for autonomous driving (e.g., rack electric power assist steering (EPAS)) encounter inherent friction and/or compliance between components of the steering system that resist the rotation of the steering column and, thus, provides torque in a similar way to the contact between the driver and the steering wheel. As such, the automated system may fail to detect when the driver is driving with her/his hands off because the friction and/or compliance between the components of the steering system presents a torque similar to the torque the driver produces via contact with the steering wheel. In addition, manufacturing variability causes the friction and/or compliance between the components of the steering system to be vehicle dependent, which makes offsetting the friction and/or compliance difficult.

Accordingly, to avoid a false hands on detection, some automated systems associate a significant torque threshold with a hands on condition to offset the friction and/or compliance between the components of the steering system. However, the significant torque threshold can result in false hands off detections as the torque that the driver inputs on the steering wheel must overcome the friction and/or compliance between the components of the steering system in addition to overcoming the significant torque threshold. Consequently, the automated system may present false hands off notifications when the driver has their hands on the steering wheel, which can cause annoyance to the driver. As a result, the driver may avoid utilizing the autonomous driving features.

Examples disclosed herein provide an autonomous steering control system to control torque thresholds for HOOD in rack EPAS systems that utilize level 2 or 3 autonomous driving features. The example power steering control system controls the torque thresholds to enable the driver to satisfy a first torque threshold (e.g., generate a torque greater than the first torque threshold) or a second torque threshold (e.g., generate a torque less than the second torque threshold) associated with a hands on condition without having to overcome a significant amount of friction and/or compliance between components of the steering system. Although the example autonomous steering control system disclosed herein controls the torque threshold for HOOD in rack EPAS systems, it should be understood that examples disclosed herein may be implemented in any other power assist steering system.

An example power steering system disclosed herein includes an autonomous steering control system, a motor coupled to a rack, and a torque sensor coupled to an interface of the rack and a steering column. In some examples, a current associated with the motor indicates a velocity of the rack. In such examples, the autonomous steering control system controls the torque thresholds associated the hands on condition based on a velocity of a rack. For example, the autonomous steering control system can compare the velocity of the rack to a first rack velocity threshold and/or a second rack velocity threshold. Accordingly, the velocity of the rack corresponds to an angular velocity of a steering wheel. In some examples, the first rack velocity threshold is associated with a movement of the rack in a first direction and the second rack velocity threshold is associated a movement of the rack in a second direction opposite the first direction.

In some examples, the autonomous steering control system can adjust the first torque threshold in response to the velocity of the rack satisfying (e.g., being greater than) the first rack velocity threshold. Accordingly, the autonomous steering control system can adjust the second torque threshold in response to the velocity of the rack satisfying (e.g., being less than) the second rack velocity threshold. In some examples, the autonomous steering control system reduces the first or second torque threshold in response to the associated rack velocity threshold being satisfied. In some examples, the first torque threshold is associated with a torque between the rack and the steering column that moves the rack in the second direction and the second torque threshold is associated with a torque between the rack and the steering column that moves the rack in the first direction. As such, the autonomous steering control system reduces an effect of the torque resulting from the movement of the rack by reducing a HOOD torque threshold that is associated with moving the rack in the opposite direction. As a result, the autonomous steering control system considers the inherent friction and/or compliance between components of the steering system while enabling the driver to satisfy the HOOD torque threshold more conveniently (e.g., with less torque).

In some examples, the torque sensor determines a torque at the interface of the rack and the steering column in connection with the steering wheel. In such examples, the autonomous steering control system compares the torque between the rack and the steering column to the first torque threshold and/or the second torque threshold. As a result, the autonomous steering control system detects a hands off condition in response to the torque between the rack and the steering column not satisfying the first torque threshold or the second torque threshold. Specifically, the autonomous steering control system detects the hands off condition in response to the torque between the rack and the steering column not satisfying the first or second torque threshold for at least a first predetermined period of time (e.g., 10 milliseconds (msec.), 15 msec., 20 msec., etc.), which reduces the likelihood of false hands on detections resulting from brief increases in torque that are not indicative a driver having their hands on the steering wheel. In turn, the autonomous steering control system detects the hands on condition in response to the torque between the rack and the steering column satisfying the first or second torque threshold for at least the first predetermined period of time. In some examples, the autonomous steering control system maintains an indication of the hands on condition for a second predetermined period of time (e.g., 5 seconds (sec.), 10 sec., 15 sec., etc.) so the driver does not have to constantly provide torque.

FIG. 1 illustrates an example power steering system 100 of a vehicle. In FIG. 1, the power steering system 100 includes an autonomous steering control system 101, a steering wheel 102, a steering column 104, a steering shaft 106, a rack 108, a motor 110, an interface 112 between the steering shaft 106 and the rack 108, a torsion bar 114, and a torque sensor 116. In FIG. 1, the steering wheel 102 is coupled to the steering column 104, which rotates the steering shaft 106 as the steering wheel 102 rotates. In FIG. 1, the steering shaft 106 is coupled to the rack 108 at the interface 112. In FIG. 1, a rotational movement of the steering shaft 106 produces a translational movement of the rack 108.

In FIG. 1, the motor 110 is operatively coupled to the rack 108. In FIG. 1, the torsion bar 114 and/or the torque sensor 116 are operatively coupled to the interface 112 between the steering shaft 106 and the rack 108. In FIG. 1, the motor 110 and the torque sensor 116 are operatively coupled to the autonomous steering control system 101. In FIG. 1, the autonomous steering control system 101 provides the power steering system 100 with level 2 or 3 autonomous driving capabilities.

In FIG. 1, during example autonomous driving operations the motor 110 drives a movement of the rack 108 to steer the vehicle based on a determined path of travel. In FIG. 1, an electrical current of the motor 110 corresponds to a speed of the movement of the rack 108. For example, the motor 110 generates a back electromotive force (EMF) that varies the current through the motor 110 based on a rotational speed of the motor 110, which corresponds to the translational speed of the rack 108. In some examples, a positive or negative current associated with the motor 110 indicates a direction of the movement of the rack 108. In FIG. 1, the movement of the rack 108 results in a rotation of the steering shaft 106. As a result, the rotation of the steering shaft 106 causes the steering column 104 to rotate the steering wheel 102. In some example autonomous driving operations, the motor 110 moves the rack 108, which torques the steering shaft 106 and the steering column 104 as the power steering system 100 makes a turn. The torque sensor 116 senses the torque between the steering shaft 106 and the rack 108.

In FIG. 1, when the driver has her/his hands on the steering wheel 102 she/he is expected to resist the rotation of the steering wheel 102 and, thus, the rotation of the steering shaft 106. In FIG. 1, the torsion bar 114 encounters torque at the interface 112 as the driver resists the rotation of the steering shaft 106. Accordingly, the torque sensor 116 measures the torque at the interface 112 via the torsion bar 114. In turn, the autonomous steering control system 101 can compare the torque to torque thresholds to determine whether the driver has their hands on the steering wheel 102 (e.g., HOOD). However, the friction and/or compliance present between torsion bar 114 and the steering wheel 102 (e.g., between the rack 108 and the steering shaft 106, the steering shaft 106 and the steering column 104, and/or the steering column 104 and the steering wheel 102) resists the rotation of the steering wheel 102 in a similar way to that of the driver. Further, manufacturing variability, u-joints that connect components such as the steering column 104 to the steering shaft 106 and/or the steering shaft 106 to the rack 108, and/or dash seals that contact the steering column 104 and/or the steering shaft 106 can also cause a significant torque.

In some previous examples, a torque threshold for HOOD detection is based on the friction and/or compliance associated with the power steering system 100, which results in a significant increase in the torque threshold(s) to avoid false hands on detection. In such previous examples, the driver must provide a torque that overcomes the friction within the power steering system 100, the torque between the steering shaft 106 and the rack 108, and/or the torque threshold for the power steering system 100 to detect the hands on condition.

In FIG. 1, the autonomous steering control system 101 reduces a torque threshold associated with the torque caused by autonomous driving operations (e.g., from the movement of the rack 108). As a result, the autonomous steering control system 101 reduces the amount of torque that the driver needs to provide to satisfy the torque threshold and, thus, minimize false hands off detections. In addition, the autonomous steering control system 101 maintains a torque threshold associated with a same direction as the torque caused by the movement of the rack 108. As a result, the autonomous steering control system 101 minimizes false hands on detections as the torque threshold corresponds with the inherent friction and/or torque within the power steering system 100.

Figure 2:
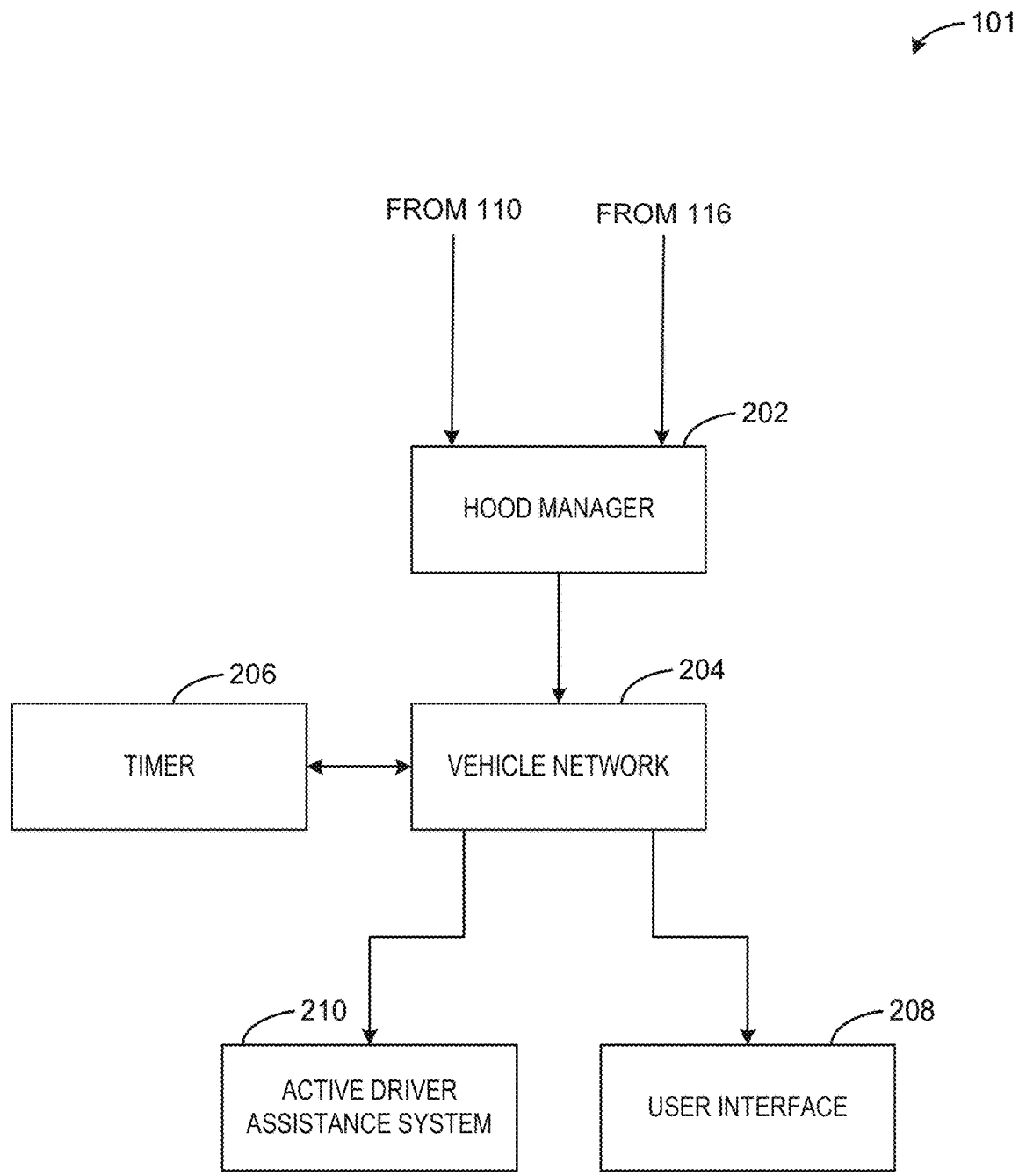
FIG. 2 is a block diagram of an example autonomous steering control system of the example steering system of FIG. 1.

FIG. 2 is a block diagram of the example autonomous steering control system 101 of FIG. 1. In FIG. 2, the autonomous steering control system 101 includes a HOOD manager 202, a vehicle network 204, a timer 206, a user interface 208, and an active driver assistance system 210. In FIG. 2, the HOOD manager 202 is operatively coupled to the motor 110 and the torque sensor 116 of FIG. 1.

In FIG. 2, the HOOD manager 202 receives a signal indicative of the current of the motor 110, which corresponds to a velocity of the rack 108 of FIG. 1. Accordingly, the HOOD manager 202 determines the velocity of the rack 108 based on a predetermined relationship between the current of the motor 110 and the velocity of the rack 108. In some examples, the HOOD manager 202 adjusts a torque threshold in response to the velocity of the rack satisfying a velocity threshold, as discussed further in association with FIG. 3. In addition, the HOOD manager 202 receives from the torque sensor 116 a signal indicative of a torque between the rack 108 and the steering shaft 106. In FIG. 2, the HOOD manager 202 compares the torque measured by the torque sensor 116 to at least one torque threshold. In FIG. 2, the HOOD manager 202 determines whether the driver has her/his hands on the steering wheel 102 based on the comparison between the torque measured by the torque sensor 116 and the at least one torque threshold, as discussed further in association with FIG. 3. In FIG. 2, the HOOD manager 202 transmits a hands on condition notification or a hands off condition notification to the vehicle network 204 in response to the comparison.

In FIG. 2, the vehicle network 204 receives the hands on or off condition notification. In some examples, the vehicle network 204 initiates the timer 206 in response to receiving the hands off condition notification. In some examples, the vehicle network 204 transmits the hands off condition notification to the user interface 208. In some examples, the vehicle network 204 transmits the hands on condition to the user interface 208.

In FIG. 2, the timer 206 records a period of time for which the hands off condition persists. In some examples, the vehicle network 204 transmits an updated hands off condition notification to the user interface 208 in response to the timer 206 exceeding a first predetermined period of time (e.g., 20 sec., 30 sec., 40 sec., etc.). Further, the vehicle network 204 can determine that the driver is unresponsive and/or inattentive (e.g., asleep) in response to the timer 206 exceeding a second predetermined period of time (e.g., 1 minute (min.), 2 min., 3 min., etc.). In some examples, the vehicle network 204 provides a safety alert signal to the active driver assistance system 210 in response to the timer 206 exceeding the second predetermined period of time.

In FIG. 2, the user interface 208 enables the driver to activate and/or deactivate the autonomous steering control system 101. For example, the user interface 208 can include a touch screen, a switch, and/or voice recognition capabilities that enable the driver to activate and/or deactivate the autonomous steering control system 101. In FIG. 2, the user interface 208 provides a hands off detection warning (e.g., an audio alert, a visual alert, etc.) to the driver in response to the receiving the hands off detection notification from the vehicle network 204. In FIG. 2, the user interface 208 updates the hands off detection warning in response to receiving the updated hands off condition notification from the vehicle network 204. For example, the user interface 208 can increase a volume and/or a frequency of the audio alert to the driver.

In FIG. 2, the active driver assistance system 210 safely pulls over and stops the vehicle in response to receiving the safety alert signal from the vehicle network 204. In some examples, the active driver assistance system 210 activates hazard lights of the vehicle to caution nearby drivers. In some examples, the active driver assistance system 210 alerts an outside party that the driver needs assistance.

Figure 3:
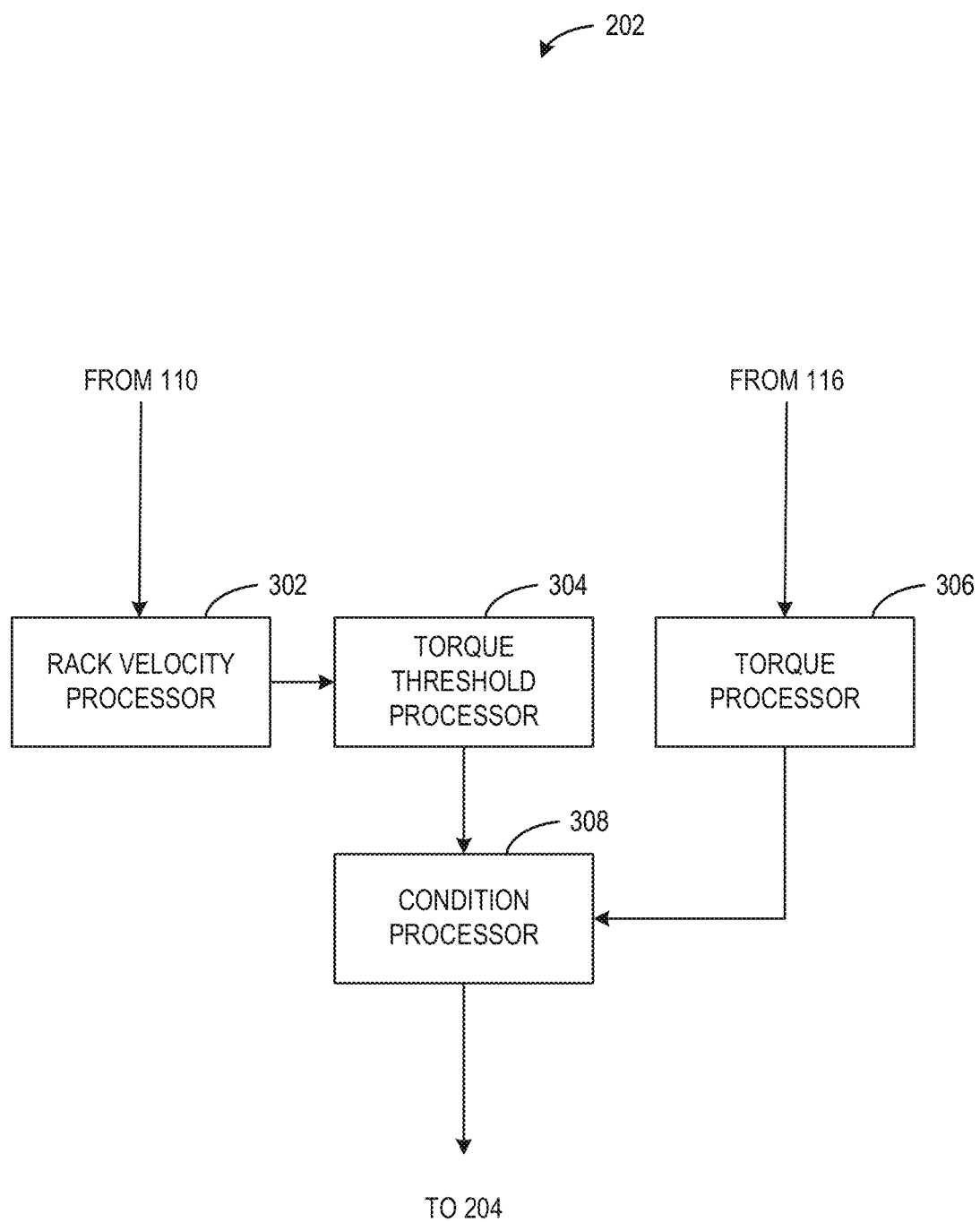
FIG. 3 is a block diagram of an example hands on/off detection (HOOD) manager of the example autonomous steering control system of FIGS. 1 and/or 2.

FIG. 3 is a block diagram of the HOOD manager 202. In FIG. 3, the HOOD manager 202 includes a rack velocity processor 302, a torque threshold processor 304, a torque processor 306, and a condition processor (e.g., a hands on/off condition processor) 308. In FIG. 3, the rack velocity processor 302 is operatively coupled to the motor 110 of FIG. 1. In FIG. 3, the torque processor 306 is operatively coupled to the torque sensor 116 of FIG. 1.

In FIG. 3, the rack velocity processor 302 determines a velocity of the rack 108 based on a current associated with the motor 110. For example, the rack velocity processor 302 can measure the current that the motor 110 utilizes to drive a movement of the rack 108. In some examples, the rack velocity processor 302 correlates the current associated with the motor 110 with the velocity of the rack 108 based on a predetermined relationship between the current and the velocity. In FIG. 3, the rack velocity processor 302 transmits the velocity of the rack 108 to the torque threshold processor 304.

In FIG. 3, the torque threshold processor 304 determines a first torque threshold and a second torque threshold to be associated with a hands on condition. In some examples, the torque threshold processor 304 initializes the first and second torque thresholds to predetermined values in response to activation of the autonomous steering control system 101. The predetermined values of the first and second torque thresholds can be dependent on the vehicle utilizing the power steering system 100 in addition to the inherent friction and/or compliance between components of the power steering system 100. In some examples, the first torque threshold is associated with a torque on the steering wheel in a first direction (e.g., a counterclockwise direction) and the second torque threshold is associated with a torque on the steering in a second direction (e.g., a clockwise direction). Accordingly, the first torque threshold is associated with a torque on the steering wheel 102 that turns wheels of the vehicle leftward (e.g., moves the rack 108 leftward) and the second torque threshold is associated with a torque on the steering wheel 102 that turns the wheels of the vehicle rightward (e.g., moves the rack 108 rightward)

In FIG. 3, the torque threshold processor 304 receives the velocity of the rack 108 from the rack velocity processor 302. In FIG. 3, the torque threshold processor 304 controls the first and second torque thresholds based on the velocity of the rack 108. In some examples, the torque threshold processor 304 compares the velocity of the rack 108 to a first velocity threshold and/or a second velocity threshold. In some examples, the first velocity threshold is associated with a movement of the rack 108 in a first direction (e.g., rightward) and the second velocity threshold is associated with a movement of the rack in a second direction (e.g., leftward). In such examples, the velocity of the rack 108 further indicates the direction of the movement. For example, a velocity in the first direction can be associated with a positive velocity of the rack 108 while a velocity in the second direction is associated with a negative velocity of the rack 108. In some examples, the torque threshold processor 304 determines an angular velocity of the steering wheel 102 (radians per second (rad/s)) that corresponds to the velocity of the rack 108.

In FIG. 3, the torque threshold processor 304 anticipates a torque that results from the velocity of the rack 108 when the driver has her/his hands off the steering wheel 102. As a result, the torque threshold processor 304 can adjust the first or second torque threshold based on the torque resulting from the velocity of the rack 108 for accurate HOOD. In FIG. 3, the torque threshold processor 304 adjusts the first torque threshold in response to the velocity of the rack 108 satisfying (e.g., being greater than) the first velocity threshold. For example, the torque threshold processor 304 can reduce the first torque threshold (e.g., a torque threshold associated with a leftward turn) in response to the velocity of the rack 108 satisfying the first velocity threshold (e.g., a threshold velocity of the rack 108 associated with a rightward turn). In such examples, the first torque threshold is associated with a positive torque and, thus, the driver satisfies the first torque threshold by implementing a torque greater than the first torque threshold (e.g., an upper torque threshold, a positive torque threshold).

In FIG. 3, the torque threshold processor 304 adjusts the second torque threshold in response to the velocity of the rack 108 satisfying (e.g., being less than) the second velocity threshold. For example, the torque threshold processor 304 can increase the second torque threshold, which is associated with a negative torque. Accordingly, the driver satisfies the second torque threshold by providing a torque less than the second torque threshold (e.g., a lower torque threshold, a negative torque threshold). In some examples, the torque threshold processor 304 adjusts the first or second torque threshold based on the angular velocity of the steering wheel 102 that corresponds to the velocity of the rack 108, as discussed further in association with FIG. 4.

As such, the torque threshold processor 304 can offset a torque measured by the torque sensor 116 that results from the velocity of the rack 108 and the friction and/or compliance of the power steering system 100. As a result, the driver no longer needs to overcome a significant static torque threshold in addition to the torque caused by the velocity of the rack 108 and the friction associated with the power steering system 100 to satisfy the hands on condition. In FIG. 3, the torque threshold processor 304 transmits the first torque threshold and/or the second torque threshold to the condition processor 308.

In FIG. 3, the torque processor 306 receives a signal from the torque sensor 116 corresponding to a steering torque (e.g., a torque between the steering shaft 106 and the rack 108). In FIG. 3, the torque processor 306 determines the steering torque based on the signal from the torque sensor 116. In FIG. 3, a steering torque in a first direction (e.g., a counterclockwise direction) is associated with a positive (+) torque and a steering torque in a second direction (e.g., a clockwise direction) is associated with a negative (−) torque. In FIG. 3, the torque processor 306 transmits the steering torque to the condition processor 308.

In FIG. 3, the condition processor 308 detects a hands off condition or a hands on condition based on the first torque threshold, the second torque threshold, and the steering torque. For example, the condition processor 308 compares the steering torque to the first torque threshold and/or the second torque threshold. In FIG. 3, the condition processor 308 detects the hands off condition in response to the steering torque not satisfying the first torque threshold and the second torque threshold (e.g., being less than the first torque threshold and greater than the second torque threshold). Accordingly, the condition processor 308 detects the hands on condition in response to the steering torque satisfying the first or second torque threshold (e.g., being greater than the first torque threshold or less than the second torque threshold).

In FIG. 3, the condition processor 308 detects the hands off condition in response to the steering torque not satisfying the first or second torque threshold for at least a threshold period of time (e.g., 10 msec., 15 msec., 20 msec., etc.). As such, the condition processor 308 minimizes false hands on or off detections that can otherwise result from brief increases in torque that are not indicative of the driver having her/his hands on the steering wheel 102. In some examples, the condition processor 308 maintains an indication of the hands on condition for a predetermined period of time (e.g., 5 sec., 10 sec., 15 sec., etc.) in response to detection of the hands on condition. Accordingly, the driver is able to satisfy the hands on condition without constantly implementing a torque that satisfies the first or second torque threshold. In FIG. 3, the condition processor 308 transmits the hands on condition or the hands off condition to the vehicle network 204 of FIG. 2.

Figure 4:
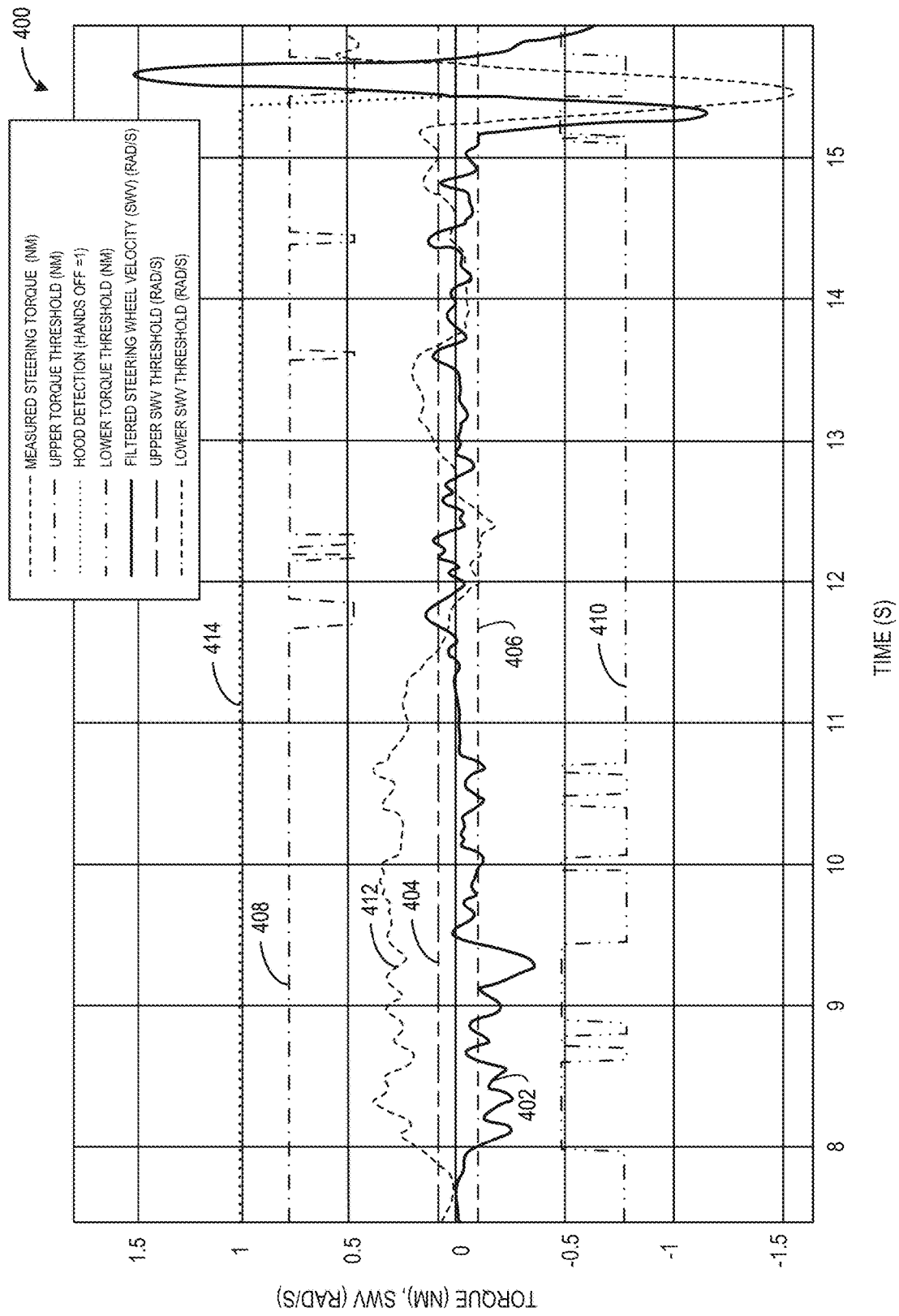
FIG. 4 illustrates example operations of the example HOOD manager of FIGS. 2 and/or 3.

FIG. 4 illustrates a graph 400 representative of example operations of the HOOD manager 202 of FIGS. 2 and/or 3. In FIG. 4, the graph 400 includes steering torque (Newton meters (Nm)) and steering wheeling velocity (SWV) (radians per second (rad/s)) on the y-axis and time(s) on the x-axis. In FIG. 4, the graph 400 further includes a filtered steering wheel velocity (SWV) 402, an upper SWV threshold (e.g., a first SWV threshold) 404, a lower SWV threshold (e.g., a second SWV threshold) 406, an upper torque threshold (e.g., a first torque threshold) 408, a lower torque threshold (e.g., a second torque threshold) 410, a steering torque 412, and a HOOD output 414.

In FIG. 4, the filtered SWV 402 corresponds to a velocity of the rack 108 of FIG. 1. For example, the rack velocity processor 302 of FIG. 3 can determine the filtered SWV 402 based on the current associated with the motor 110 of FIGS. 1 and 2. Accordingly, the upper and lower SWV thresholds 404, 406 correspond to the first and second velocity thresholds associated with the rack 108. In FIG. 4, the torque threshold processor 304 controls the upper and lower torque thresholds 408, 410 based on the filtered SWV 402 and the upper and lower SWV thresholds 404, 406. In some examples, the torque threshold processor 304 controls the upper and lower torque thresholds 408, 410 based on the velocity of the rack 108 and associated rack velocity thresholds.

In FIG. 4, the torque threshold processor 304 initializes the upper torque threshold 408 and the lower torque threshold 410 to correspond to a first predetermined torque (e.g., 0.79 Nm, 0.89 Nm, 1 Nm, etc.) and a second predetermined torque (e.g., −0.79 Nm, −0.89 Nm, −1.0 Nm, etc.), respectively. In FIG. 4, the torque threshold processor 304 reduces the upper torque threshold 408 by a predetermined amount (e.g., 0.3 Nm, 0.4 Nm, etc.) or increases the lower torque threshold 410 by the predetermined amount in response to the filtered SWV 402 satisfying the upper SWV threshold 404 or the lower SWV threshold 406, respectively. In some examples, the torque threshold processor 304 adjusts the upper and lower torque thresholds 408, 410 to be a portion (e.g., 60%, 50%, 40%, etc.) of the first predetermined torque and the second predetermined torque in response to the filtered SWV 402 satisfying the upper SWV threshold 404 or the lower SWV threshold 406.

In FIG. 4, the torque sensor 116 of FIG. 1 measures the steering torque 412. In FIG. 4, the condition processor 308 determines the HOOD output 414 based on the upper and lower torque thresholds 408, 410 and the steering torque 412. In FIG. 4, the HOOD output 414 is a digital output with a first signal (e.g., a binary value of 1) corresponding to a hands off condition and a second signal (e.g., a binary output of 0) corresponding to a hands on condition.

In FIG. 4, the condition processor 308 compares the measured steering torque 412 to the upper torque threshold 408 and/or the lower torque threshold 410. In FIG. 4, the condition processor 308 transmits the first output signal to the vehicle network 204 of FIG. 2 to indicate a hands off condition in response to the measured steering torque 412 not satisfying the upper torque threshold 408 or the lower torque threshold 410 for at least a predetermined period of time (e.g., a threshold period of time). In FIG. 4, the condition processor 308 transmits the second output to the vehicle network 204 to indicate a hands on condition in response the measured steering torque 412 satisfying the upper or lower torque threshold 408, 410 for at least the predetermined period of time.

In FIG. 4, the adjustment of the upper and lower torque thresholds 408, 410 by the torque threshold processor 304 enables a driver to satisfy the upper or lower torque threshold 408, 410 while implementing less torque on the steering wheel 102 (e.g., the steering torque 412). Specifically, the torque threshold processor 304 reduces the upper torque threshold 408 or increases the lower torque threshold 410 to offset at least a portion of the torque between the rack 108 and the steering shaft 106 that occurs in response to the driver having her/his hands off the steering wheel 102. As a result, the torque threshold processor 304 reduces a difference between the measured steering torque 412 and the upper or lower torque threshold 408, 410, which enables the driver to satisfy the upper or lower torque threshold 408, 410 more conveniently (e.g., with less torque).

While an example manner of implementing the autonomous steering control system 101 of FIGS. 1, 2, and/or 3 is illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example motor 110, the example torque sensor 116, the example HOOD manager 202, the example vehicle network 204, the example timer 206, the example user interface 208, the example active driver assistance system 210, the example rack velocity processor 302, the example torque threshold processor 304, the example torque processor 306, the example condition processor 308, and/or, more generally, the example autonomous steering control system 101 of FIGS. 1, 2, and/or 3 may be implemented by hardware, software, firmware and/or any combination of hardware, software and/or firmware. Thus, for example, any of the example motor 110, the example torque sensor 116, the example HOOD manager 202, the example vehicle network 204, the example timer 206, the example user interface 208, the example active driver assist system 210, the example rack velocity processor 302, the example torque threshold processor 304, the example torque processor 306, the example condition processor 308, and/or, more generally, the example autonomous steering control system 101 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example motor 110, the example torque sensor 116, the example HOOD manager 202, the example vehicle network 204, the example timer 206, the example user interface 208, the example active driver assist system 210, the example rack velocity processor 302, the example torque threshold processor 304, the example torque processor 306, the example condition processor 308, and/or the example autonomous steering control system 101 is/are hereby expressly defined to include a non-transitory computer readable storage device or storage disk such as a memory, a digital versatile disk (DVD), a compact disk (CD), a Blu-ray disk, etc. including the software and/or firmware. Further still, the example autonomous steering control system 101 of FIGS. 1, 2, and/or 3 may include one or more elements, processes and/or devices in addition to, or instead of, those illustrated in FIGS. 2 and/or 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
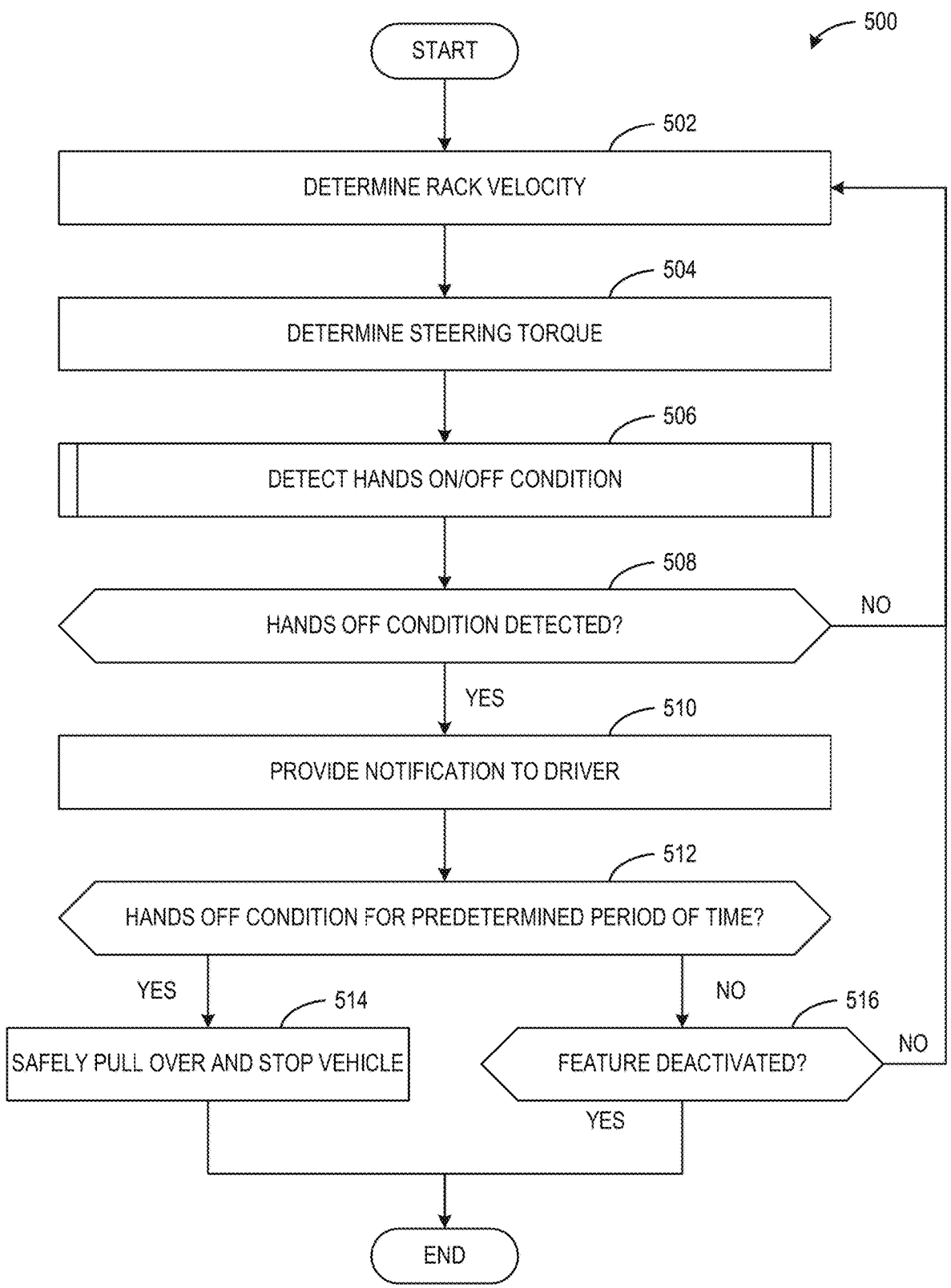
FIG. 5 is a flowchart representative of machine readable instructions which may be executed to implement the example HOOD manager associated with the autonomous steering control system of FIGS. 1, 2, and/or 3.

A flowchart representative of example hardware logic, machine readable instructions, hardware implemented state machines, and/or any combination thereof for implementing the autonomous steering control system 101 of FIGS. 1, 2, and/or 3 is shown in FIGS. 5 and/or 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 5 and/or 6, many other methods of implementing the example autonomous steering control system 101 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of machine readable instructions 500 which may be executed to implement the example autonomous steering control system of FIGS. 1, 2, and/or 3. At block 502, the autonomous steering control system 101 determines a velocity of the rack 108 of FIG. 1. For example, the HOOD manager 202 of FIGS. 2 and/or 3 determines the velocity of the rack 108 based on a current associated with the motor 110 of FIGS. 1, 2, and/or 3 in connection with the rack 108. In some examples, the rack velocity processor 302 of FIG. 3 determines the velocity of the rack 108 based on the back EMF of the motor 110. In some examples, the rack velocity processor 302 determines an angular velocity of the steering wheel 102 of FIG. 1 (e.g., the filtered SWV 402 of FIG. 4) based on the velocity of the rack 108.

At block 504, the autonomous steering control system 101 determines a steering torque (e.g., the measured steering torque 412 of FIG. 4) between the steering shaft of FIG. 1 and the rack 108. For example, the torque sensor 116 measures the steering torque at the interface 112 between the steering shaft 106 and the rack 108 via the torsion bar 114 of FIG. 1. In some examples, the HOOD manager 202 determines the steering torque based on a signal from the torque sensor 116. For example, the torque processor 306 of FIG. 3 can determine the steering torque based on an output voltage of the torque sensor 116.

At block 506, the autonomous steering control system 101 detects a hands on condition or a hands off condition. For example, the HOOD manager 202 detects the hands on condition or the hands off condition based on the steering torque and torque thresholds associated with the hands on condition (e.g., the upper torque threshold 408 and the lower torque threshold 410), as discussed further in association with FIG. 6. In some examples, the torque threshold processor 304 of FIG. 3 determines the torque thresholds associated with the hands on condition based on the velocity of the rack 108 and/or the angular velocity of the steering wheel 102. In some examples, the condition processor 308 of FIG. 3 compares the steering torque to the torque thresholds associated with the hands on condition to detect the hands on condition or the hands off condition.

At block 508, the autonomous steering control system 101 determines whether the hands off condition is detected. For example, the HOOD manager 202 can transmit a signal corresponding to the detection of the hands on condition or the hands off condition (e.g., the HOOD output 414 of FIG. 4) to the vehicle network 204 of FIG. 2. Further, the vehicle network 204 can determine whether the signal corresponds to the detection of the hands on condition or the hands off condition. In some examples, the vehicle network 204 activates the timer 206 of FIG. 2 in response the output signal of the HOOD manager 202 corresponding to the hands off condition. In such examples, the machine readable instructions 500 proceed to block 510 in response to the autonomous steering control system 101 detecting the hands off condition. In some examples, the machine readable instructions 500 return to block 502 in response to autonomous steering control system 101 detecting the hands on condition.

At block 510, the autonomous steering control system 101 provides a notification to the driver. For example, the vehicle network 204 indicates the hands off condition to the user interface 208 in response to the HOOD manager 202 detecting the hands off condition. Further, the user interface 208 can provide a hands off detection notification to the driver. In some examples, the user interface 208 provides a visual alert, such as illuminating a warning light and/or presenting text on a display, for example. In some examples, the user interface 208 provides an audio alert, such as a verbal notification, a beeping, and/or any other audio tone, for example, in addition to or instead of the visual alert. In such examples, the user interface 208 updates a frequency and/or volume of the audio alert in response to the autonomous steering control system 101 not detecting a hands on condition for a threshold period of time. For example, the vehicle network 204 can provide an indication to the user interface 208 in response to the timer 206 surpassing the threshold period of time, which causes the user interface 208 to increase the frequency and/or volume of the audio alert.

At block 512, the autonomous steering control system 101 determines whether the detection of the hands off condition persists for a predetermined period of time. For example, the timer 206 can record a duration of the hands off condition. Further, the vehicle network 204 can compare the duration of the hands off condition to the predetermined period of time. In some examples, the machine readable instructions proceed to block 514 in response to the duration of the hands off condition exceeding the predetermined period of time. In some examples, the machine readable instructions proceed to block 516 in response to the autonomous steering control system 101 detecting the hands on condition in advance of the duration of the hands off condition exceeding the predetermined period of time.

At block 514, the autonomous steering control system 101 safely pulls over and stops the vehicle. For example, the vehicle network 204 can provide a safety alert signal to the active driver assistance system 210 of FIG. 2. As a result, the active driver assistance system 210 utilizes autonomous driving capabilities to move the vehicle to a safe position, such as the side of the road, and stop the vehicle. In some examples, the active driver assistance system 210 activates hazard lights of the vehicle to notify nearby drivers of the potential hazards associated with an inattentive driver. Further, the vehicle network 204 and/or the active driver assistance system 210 can generate a distress call in response to the driver remaining unresponsive for an additional period of time.

At block 516, the autonomous steering control system 101 determines whether the associated autonomous steering features have been deactivated. For example, the user interface 208 can include a button and/or a touchscreen in connection with the vehicle network 204, which enables the driver to deactivate the autonomous steering features associated with the autonomous steering control system 101. In turn, the vehicle network 204 can deactivate the HOOD manager 202, the timer 206, and/or the active driver assistance system 210, which enables the driver to drive the vehicle manually. In some examples, the machine readable instructions 500 return to block 502 in response to the autonomous steering features not being deactivated. In some other examples, the machine readable instructions 500 are terminated in response to the autonomous steering feature being deactivated.

Figure 6:
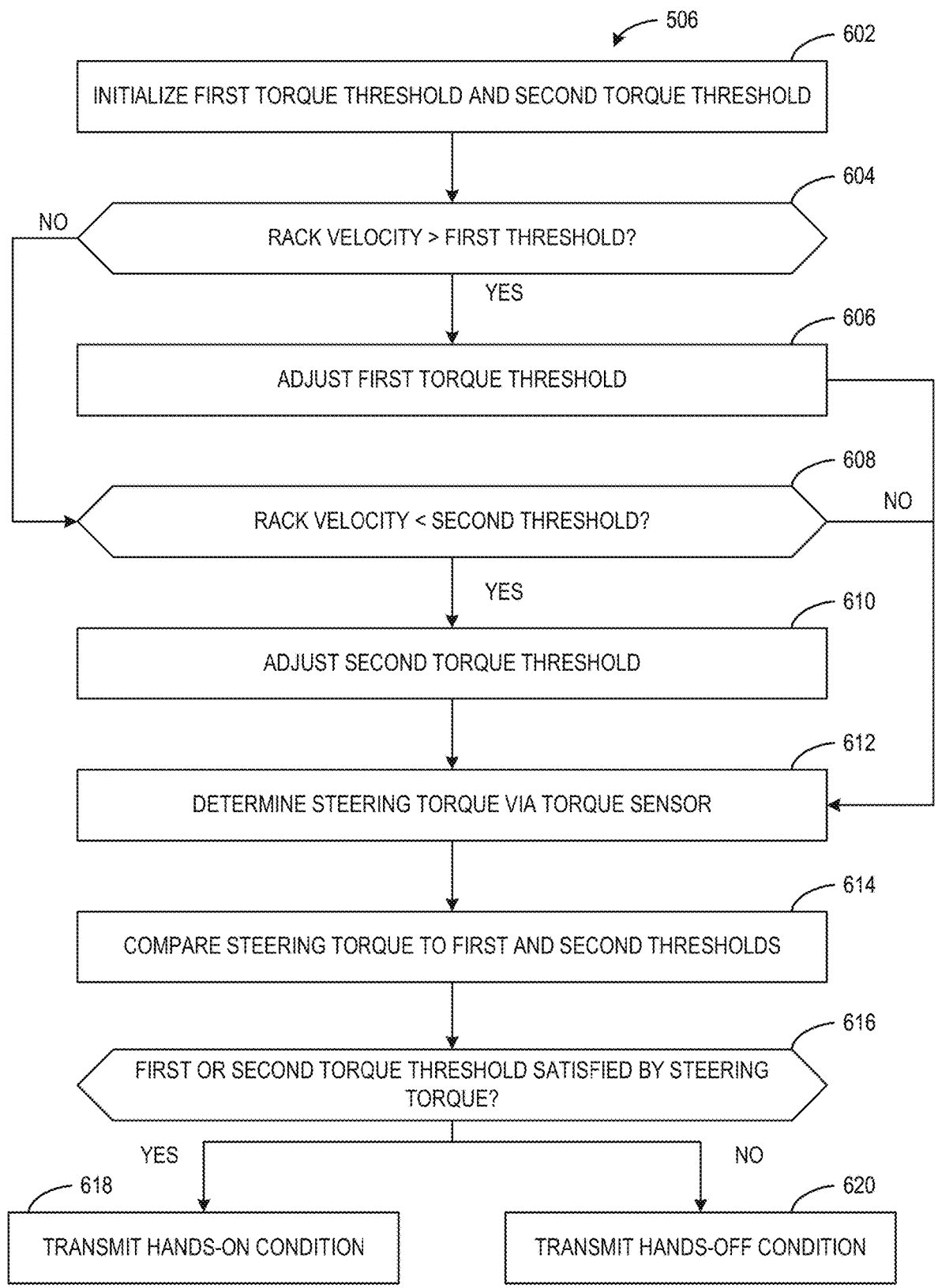
FIG. 6 is a flowchart representative of machine readable instructions which may be executed to implement the example HOOD manager of FIGS. 2 and/or 3.

FIG. 6 is a flowchart representative of machine readable instructions 506 which may be executed to implement the example HOOD manager 202 of FIGS. 2 and/or 3. At block 602, the HOOD manager 202 initializes a first torque threshold and a second torque threshold. For example, the torque threshold processor 304 can initialize the first torque threshold (e.g., the upper torque threshold 408 of FIG. 4) and the second torque threshold (e.g., the lower torque threshold 410 of FIG. 4) to a first and second predetermined value, respectively. In some examples, the predetermined values to which the torque threshold processor 304 initializes the first and second torque threshold are based on the power steering system 100 and/or the vehicle associated with the HOOD manager 202.

At block 604, the HOOD manager 202 determines whether a velocity of the rack 108 satisfies a first velocity threshold. For example, the rack velocity processor 302 provides the velocity of the rack 108 and/or the angular velocity of the steering wheel 102 to the torque threshold processor 304. Further, the torque threshold processor 304 compares the velocity of the rack 108 and/or the angular velocity of the steering wheel 102 to the first velocity threshold (e.g., a positive (+) rack velocity threshold, the upper SWV threshold 404 of FIG. 4). As a result, the torque threshold processor 304 determines whether the velocity of the rack 108 and/or the angular velocity of the steering wheel 102 satisfies (e.g., is greater than) the first velocity threshold. In some examples, the machine readable instructions 506 proceed to block 608 in response to the velocity of the rack 108 and/or the angular velocity of the steering wheel 102 not satisfying (e.g., being less than) the first velocity threshold.

At block 606, the HOOD manager 202 adjusts a first torque threshold. For example, the torque threshold processor 304 can adjust the first torque threshold (e.g., a positive (+) torque threshold, the upper torque threshold 408 of FIG. 4) in response to the velocity of the rack 108 and/or the angular velocity of the steering wheel 102 satisfying the first velocity threshold. In some examples, the torque threshold processor 304 reduces the first torque threshold by a predetermined amount. In such examples, the torque threshold processor 304 transmits the first and/or second torque threshold to the condition processor 308. In some examples, the machine readable instructions 506 proceed to block 612 in response to the torque threshold processor 304 adjusting the first torque threshold.

At block 608, the HOOD manager 202 determines whether the velocity of the rack 108 satisfies a second velocity threshold. For example, the torque threshold processor 304 compares the velocity of the rack 108 and/or the angular velocity of the steering wheel 102 to the second velocity threshold (e.g., a negative (−) rack velocity threshold, the lower SWV threshold 406 of FIG. 4). As a result, the torque threshold processor 304 determines whether the velocity of the rack 108 and/or the angular velocity of the steering wheel 102 satisfies (e.g., is less than) the second velocity threshold. In some examples, the machine readable instructions 506 skip to block 612 in response to the velocity of the rack 108 and/or the angular velocity of the steering wheel 102 not satisfying (e.g., being greater than) the second velocity threshold.

At block 610, the HOOD manager 202 adjusts a second torque threshold. For example, the torque threshold processor 304 can adjust the second torque threshold (e.g., a negative (−) torque threshold, the lower torque threshold 410 of FIG. 4) in response to the velocity of the rack 108 and/or the angular velocity of the steering wheel 102 satisfying the second velocity threshold. In some examples, the torque threshold processor 304 increases the second torque threshold by a predetermined amount. In such examples, the torque threshold processor 304 transmits the first and/or second torque threshold to the condition processor 308.

At block 612, the HOOD manager 202 determines a steering torque at the interface 112 of the steering shaft 106 and the rack 108. For example, the torque sensor 116 can measure the steering torque at the interface 112 of the steering shaft 106 and the rack 108 via the torsion bar 114. Further, the torque processor 306 can determine the steering torque based on a voltage output of the torque sensor 116. In some examples, the torque processor 306 transmits the steering torque to the condition processor 308.

At block 614, the HOOD manager 202 compares the steering torque to the first torque threshold and the second torque threshold. For example, the condition processor 308 can receive the first and second torque thresholds and the steering torque from the torque threshold processor 304 and the torque processor 306, respectively. In turn, the condition processor 308 compares the steering torque to the first torque threshold and/or the second torque threshold.

At block 616, the HOOD manager 202 determines whether the steering torque satisfies the first torque threshold or the second torque threshold. For example, the condition processor 308 can determine whether the steering torque satisfies the first torque threshold or the second torque threshold in response to comparing the steering torque to the first and/or second torque thresholds. In some examples, the condition processor 308 determines whether the steering torque satisfies the first or second torque threshold for a predetermined period of time. In some examples, the machine readable instructions 506 proceed to block 618 in response to the HOOD manager 202 determining that the steering torque satisfies the first or second torque threshold. In some examples, the machine readable instructions proceed to block 620 in response to the HOOD manager 202 determining that the first and second torque threshold are not satisfied by the steering torque.

At block 618, the HOOD manager 202 transmits a hands on condition to the vehicle network 204. For example, the condition processor 308 transmits the hands on condition to the vehicle network 204 in response to the steering torque satisfying the first or second torque threshold for at least the predetermined period of time.

At block 620, the HOOD manager 202 transmits a hands off condition to the vehicle network 204. For example, the condition processor 308 transmits the hands off condition to the vehicle network 204 in response to the steering torque not satisfying the first or second torque threshold for the predetermined period of time.

Figure 7:
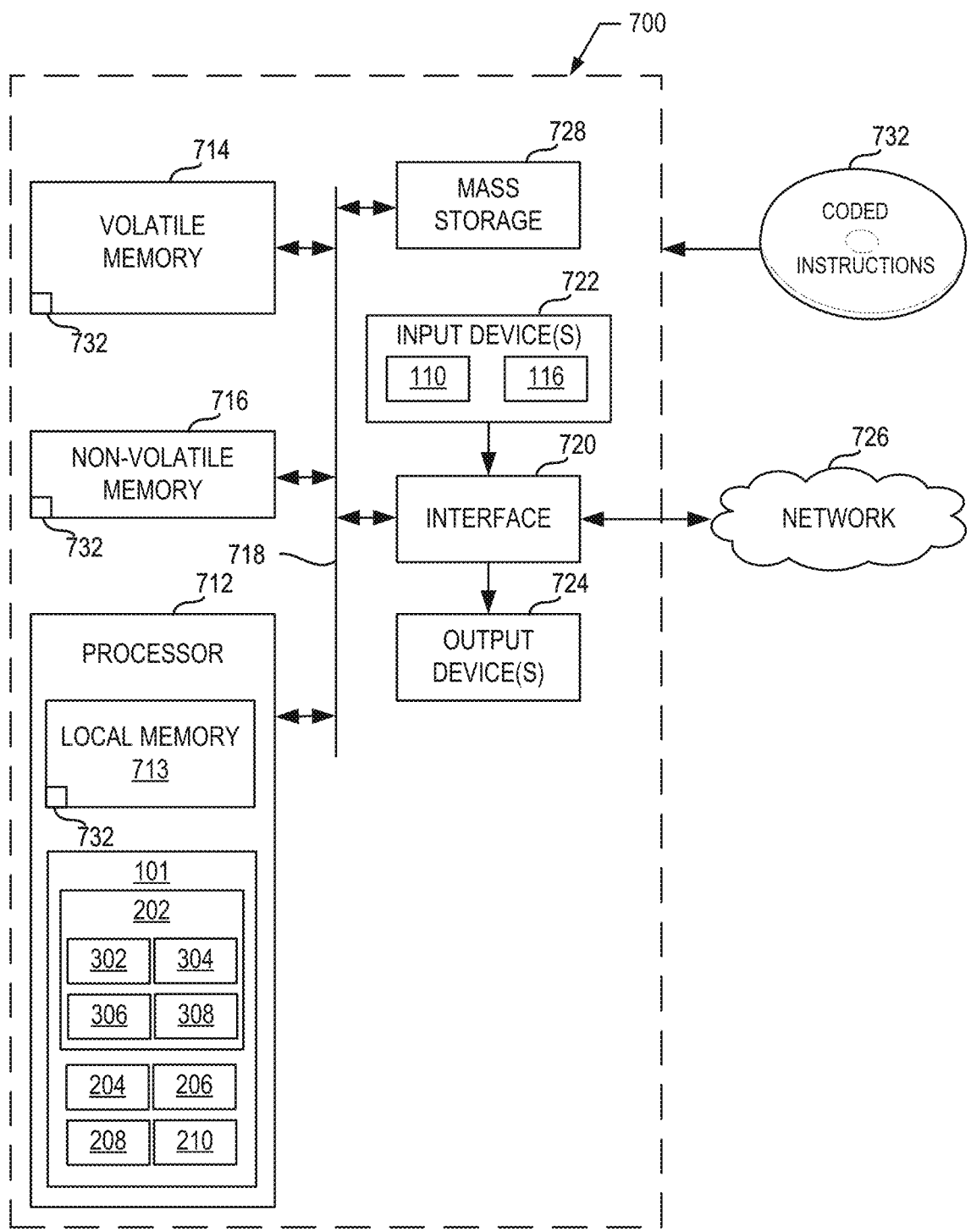
FIG. 7 is a block diagram of an example processing platform structured to execute the instructions of FIGS. 5 and/or 6 to implement the example autonomous steering control system of FIGS. 1, 2, and/or 3.

FIG. 7 is a block diagram of an example processor platform 700 structured to execute the instructions of FIGS. 5 and/or 6 to implement the autonomous steering control system 101 of FIGS. 1, 2, and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the autonomous steering control system 101, the HOOD manager 202, the vehicle network 204, the timer 206, the user interface 208, the active driver assistance system 210, the rack velocity processor 302, the torque threshold processor 304, the torque processor 306, and the condition processor 308.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input devices include the motor 110 and the torque sensor 116.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and/or 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that control a torque threshold for hands on/off detection (HOOD) in level 2 or 3 autonomous vehicles. The example methods, apparatus and articles of manufacture selectively adjust a torque threshold associated with a driver having her/his hands on a steering wheel (e.g., a hands on condition) based on a velocity of a rack of a power steering system. The example methods, apparatus and articles of manufacture anticipate a torque that results from the velocity of the rack. In turn, the example methods, apparatus and articles of manufacture selectively reduce a torque threshold associated with a steering torque that causes the rack to move in an opposite direction of the velocity of the rack, which offsets at least a portion of the torque that results from the velocity of the rack and/or the inherent friction and/or compliance within the power steering system. As such, the selective adjustment of the torque threshold produces fewer false hands off detections compared to a static threshold. In addition, the selective adjustment of the torque threshold is applied in one direction, which minimizes false hands on detections while accounting for the inherent friction and/or compliance within the power steering system.

Example methods, apparatus, systems, and articles of manufacture to control a torque threshold for hands on/off detection are disclosed herein. Further examples and combinations thereof include the following:

Example 1 includes an apparatus comprising memory including instructions, and one or more processors to execute the instructions to cause the one or more processors to at least compare a velocity of a rack to at least one of a first velocity threshold or a second velocity threshold, adjust a first torque threshold in response to the velocity of the rack satisfying the first velocity threshold, adjust a second torque threshold in response to the velocity of the rack satisfying the second velocity threshold, compare a torque between the rack and a steering shaft to at least one of the first torque threshold or the second torque threshold, and detect a hands off condition in response to the torque between the rack and the steering shaft not satisfying the first torque threshold or the second torque threshold.

Example 2 includes the apparatus of example 1, wherein the instructions, when executed, cause the one or more processors to determine the velocity of the rack based on a current of a motor associated with the rack.

Example 3 includes the apparatus of example 1, wherein the instructions, when executed, cause the one or more processors to detect the hands off condition in response to the torque between the rack and the steering shaft not satisfying the first torque threshold or the second torque threshold for at least a first predetermined period of time.

Example 4 includes the apparatus of example 3, wherein the instructions, when executed, cause the one or more processors to indicate a hands on condition for at least a second predetermined period of time in response to the torque between the rack and the steering column satisfying the first torque threshold or the second torque threshold for at least the first predetermined period of time.

Example 5 includes the apparatus of example 1, wherein the first velocity threshold is associated with the velocity of the rack in a first direction and the second velocity threshold is to be associated with the velocity of the rack in a second direction, the second direction opposite the first direction.

Example 6 includes the apparatus of example 5, wherein the first torque threshold corresponds to a torque between the rack and the steering shaft that moves the rack in the second direction.

Example 7 includes the apparatus of example 5, wherein the second torque threshold corresponds to a torque between the rack and the steering shaft that moves the rack in the first direction.

Example 8 includes a method to detect a hands on/off condition of a driver comprising comparing a velocity of a rack to a rack velocity threshold, adjusting a first torque threshold in response to the velocity of the rack satisfying the rack velocity threshold, comparing a torque between the rack and a steering shaft to at least one of the first torque threshold or a second torque threshold, and detecting a hands off condition in response to the torque not satisfying the first torque threshold or the second torque threshold.

Example 9 includes the method of example 8, wherein the velocity of the rack is determined based on a current output of a motor associated with the rack.

Example 10 includes the method of example 8, further including detecting the hands off condition in response to the torque not satisfying the first torque threshold or the second torque threshold for at least a first predetermined period of time.

Example 11 includes the method of example 10, further including indicating a hands on condition for at least a second predetermined period of time in response to the torque satisfying the first torque threshold or the second torque threshold for at least the first predetermined period of time.

Example 12 includes the method of example 8, wherein the first torque threshold corresponds to a first torque between the rack and the steering shaft that causes the rack to move in an opposite direction of the velocity of the rack.

Example 13 includes the method of example 8, wherein adjusting the first torque threshold includes reducing the first torque threshold by a predetermined amount.

Example 14 includes the method of example 8, wherein the second torque threshold corresponds to a second torque between the rack and the steering column that causes the rack to move in a same direction as the velocity of the rack.

Example 15 includes the method of example 8, wherein the velocity of the rack corresponds to an angular velocity of a steering wheel.

Example 16 includes an apparatus comprising a motor operatively coupled to a rack, a current associated with the motor to indicate a velocity of the rack, a torque sensor operatively coupled to an interface of the rack and a steering shaft, the torque sensor to determine a torque at the interface of the rack and the steering shaft, and an autonomous steering control system including a first torque threshold and a second torque threshold to be associated with a hands on/off condition, the autonomous steering control system to adjust the first or second torque threshold in response to the velocity of the rack satisfying a rack velocity threshold, compare the torque at the interface of the rack and the steering shaft to the first and second torque threshold, and detect a hands off condition in response to the torque not satisfying the first or second torque threshold.

Example 17 includes the apparatus of example 16, wherein the autonomous steering control system is to indicate the hands off condition or a hands on condition to a vehicle network.

Example 18 includes the apparatus of example 17, wherein the autonomous steering control system is to maintain an indication of the hands on condition for a predetermined period of time.

Example 19 includes the apparatus of example 16, wherein the autonomous steering control system is to detect the hands off condition in response to the torque not satisfying the first or second torque threshold for at least a threshold period of time.

Example 20 includes the apparatus of example 16, wherein the autonomous steering control system is to adjust the first torque threshold in response to the velocity of the rack satisfying the rack velocity threshold in a first direction, and adjust the second torque threshold in response to the velocity of the rack satisfying the rack velocity threshold in a second direction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory machine readable storage medium comprising instructions to cause programmable circuitry to at least:
identify a velocity of a steering rack or an angular velocity associated with a steering wheel;
cause a first torque threshold associated with a first rotational direction of the steering wheel to be different from a second torque threshold associated with a second rotational direction of the steering wheel when the velocity or the angular velocity satisfies a threshold;
identify a steering torque encountered by the steering wheel; and
detect a hands off condition when the steering torque does not satisfy the first torque threshold nor the second torque threshold.

2. The non-transitory machine readable storage medium of claim 1, wherein the instructions cause the programmable circuitry to:
identify a period of time for which the hands off condition persists; and
cause a notification to be delivered to a user interface when the period of time exceeds a first predetermined period of time.

3. The non-transitory machine readable storage medium of claim 2, wherein the instructions cause the programmable circuitry to cause a signal to be delivered to an active driver assistance system when the period of time exceeds a second predetermined period of time greater than the first predetermined period of time.

4. The non-transitory machine readable storage medium of claim 3, wherein the active driver assistance system is to cause a vehicle to at least one of pull over or stop after receiving the signal.

5. The non-transitory machine readable storage medium of claim 1, wherein the instructions cause the programmable circuitry to:
cause the first torque threshold to be less than the second torque threshold when the velocity or the angular velocity is associated with rotation of the steering wheel in the first rotational direction; and
cause the second torque threshold to be less than the first torque threshold when the velocity or the angular velocity is associated with rotation of the steering wheel in the second rotational direction.

6. The non-transitory machine readable storage medium of claim 1, wherein the instructions cause the programmable circuitry to cause the first torque threshold to match the second torque threshold when the velocity or the angular velocity does not satisfy the threshold.

7. The non-transitory machine readable storage medium of claim 1, wherein the instructions cause the programmable circuitry to detect the hands off condition when the steering torque does not satisfy the first torque threshold nor the second torque threshold for at least a threshold period of time.

8. A non-transitory machine readable storage medium comprising instructions to cause programmable circuitry to at least:
determine at least one of a first torque threshold associated with a first rotational direction of a steering wheel or a second torque threshold associated with a second rotational direction of the steering wheel based on a velocity of a steering rack or an angular velocity associated with the steering wheel;
determine a steering torque associated with the steering wheel;
detect a hands off condition in response to the steering torque not satisfying the first torque threshold nor the second torque threshold;
identify a period of time for which the hands off condition persists; and
cause a notification to be delivered to a user interface when the period of time exceeds a first predetermined period of time.

9. The non-transitory machine readable storage medium of claim 8, wherein the instructions cause the programmable circuitry to cause the first torque threshold to be different from the second torque threshold when the velocity or the angular velocity satisfies a threshold.

10. The non-transitory machine readable storage medium of claim 9, wherein the instructions cause the programmable circuitry to:
cause the first torque threshold to be less than the second torque threshold when the velocity or the angular velocity is associated with a first rotation of the steering wheel in the first rotational direction; and
cause the second torque threshold to be less than the first torque threshold when the velocity or the angular velocity is associated with a second rotation of the steering wheel in the second rotational direction.

11. The non-transitory machine readable storage medium of claim 9, wherein the instructions cause the programmable circuitry to cause the first torque threshold to match the second torque threshold when the velocity or the angular velocity does not satisfy the threshold.

12. The non-transitory machine readable storage medium of claim 8, wherein the instructions cause the programmable circuitry to cause a signal to be delivered to an active driver assistance system when the period of time exceeds a second predetermined period of time greater than the first predetermined period of time.

13. The non-transitory machine readable storage medium of claim 12, wherein the active driver assistance system is to cause a vehicle to at least one of pull over or stop after receiving the signal.

14. A method comprising:
causing a first torque threshold associated with a first rotational direction of a steering shaft to be different from a second torque threshold associated with a second rotational direction of the steering shaft when a velocity of a steering rack or an angular velocity of a steering wheel satisfies a threshold; and
detecting a hands off condition when a steering torque is between the first torque threshold and the second torque threshold for at least a predetermined period of time.

15. The method of claim 14, wherein the threshold is a first velocity threshold associated with movement of the steering rack in a first direction, wherein the first torque threshold is associated with a first rotational movement of the steering shaft that results in movement of the steering rack in a second direction opposite the first direction, further including causing the first torque threshold to be less than the second torque threshold when the velocity of the steering rack satisfies the first velocity threshold.

16. The method of claim 15, further including causing the second torque threshold to be less than the first torque threshold when the velocity of the steering rack satisfies a second velocity threshold, the second velocity threshold associated with a second rotational movement of the steering shaft that results in movement of the steering rack in the first direction.

17. The method of claim 16, further including causing the first torque threshold to match the second torque threshold when the velocity of the steering rack does not satisfy the first velocity threshold nor the second velocity threshold.

18. The method of claim 14, further including determining the velocity of the steering rack based on an electrical current associated with a motor and a predetermined relationship between the electrical current and the velocity of the steering rack.

19. The method of claim 14, further including:
- detecting the hands off condition when the steering torque does not satisfy the first torque threshold nor the second torque threshold for at least a first threshold period of time;
- causing a notification to be delivered to a user interface when the steering torque does not satisfy the first torque threshold nor the second torque threshold for at least a second threshold period of time greater than the first threshold period of time; and
- causing a signal to be delivered to an active driver assistance system when the steering torque does not satisfy the first torque threshold nor the second torque threshold for at least a third threshold period of time greater than the second threshold period of time.

* * * * *